United States Patent
Kim

(10) Patent No.: US 9,878,681 B2
(45) Date of Patent: Jan. 30, 2018

(54) BATTERY DISCONNECT UNIT

(71) Applicant: LSIS CO., LTD., Anyang-si, Gyeonggi-do (KR)

(72) Inventor: Kyoo Seok Kim, Suwon-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 231 days.

(21) Appl. No.: 14/866,583

(22) Filed: Sep. 25, 2015

(65) Prior Publication Data

US 2016/0264080 A1    Sep. 15, 2016

(30) Foreign Application Priority Data

Mar. 11, 2015 (KR) ......................... 10-2015-0033876

(51) Int. Cl.
 *B60R 16/03* (2006.01)
 *H01M 2/34* (2006.01)
 *H01H 1/58* (2006.01)

(52) U.S. Cl.
 CPC ............... *B60R 16/03* (2013.01); *H01M 2/34* (2013.01); *H01H 2001/5877* (2013.01);
 (Continued)

(58) Field of Classification Search
 CPC ..... B60R 16/03; H01M 2/34; H01M 2200/00; H01M 2250/20; H01H 2001/5877; Y02T 90/32
 (Continued)

(56) References Cited

U.S. PATENT DOCUMENTS 3,991,356 A * 11/1976 Spiteri ................. H02J 7/0042
 320/107
5,928,020 A * 7/1999 Bishop, Jr. ............ H02J 7/0045
 200/51.09
(Continued)

FOREIGN PATENT DOCUMENTS

JP    07226280    8/1995
JP    2000013927    1/2000
(Continued)

OTHER PUBLICATIONS

Japan Patent Office Application Serial No. 2015-207765, Office Action dated Nov. 1, 2016, 2 pages.
(Continued)

*Primary Examiner* — Danny Nguyen
*Assistant Examiner* — Brian K Baxter
(74) *Attorney, Agent, or Firm* — K&L Gates, LLP

(57) ABSTRACT

Disclosed is a Battery Disconnect Unit that is good in assemblability and couplability because a middle cover accommodated in a lower case stably supports a relay terminal and a guide bar and a hood structure are applied to the middle cover. The BDU is disposed between a battery and an inverter to stably supply or break power of the battery to a power system of a vehicle. The BDU includes a lower case provided in a box shape with a top opened and a middle cover accommodated into and coupled to the lower case to press the relay terminal. A relay terminal hole into which a relay terminal is fitted is disposed on a bottom of the lower case, and an electric component is mounted on a top of the middle cover. A first fixing hook capable of being fastened to the lower case is provided in the middle cover.

4 Claims, 6 Drawing Sheets

(52) U.S. Cl.
CPC .... *H01M 2200/00* (2013.01); *H01M 2220/20* (2013.01); *Y02T 90/32* (2013.01)

(58) Field of Classification Search
USPC ........ 307/10.7; 200/181, 19.26, 1 A, 2, 237,
200/246, 255, 263, 268, 275, 280, 284,
200/293–297, 302.3, 305, 308, 335, 400,
200/48 R, 50.1, 50.18, 50.2, 50.21, 50.28,
200/50.32, 51.09, 51.12, 51 R, 555, 60;
439/114, 136, 188, 209, 252, 289, 34,
439/362, 372, 509, 535, 586, 620.01,
439/620.09, 660, 665, 700, 701, 709, 814
See application file for complete search history.

(56) References Cited

U.S. PATENT DOCUMENTS

| | | | | |
|---|---|---|---|---|
| 5,995,380 | A | * | 11/1999 | Maue ................ B60R 16/0238 174/254 |
| 6,095,670 | A | * | 8/2000 | Vosika .................... F21V 21/02 362/368 |
| 6,132,070 | A | * | 10/2000 | Vosika .................... F21V 21/02 362/368 |
| 6,227,913 | B1 | * | 5/2001 | Davis ........................ H02B 1/18 439/620.26 |
| 2002/0031924 | A1 | * | 3/2002 | Davis .................. H01R 9/2491 439/76.2 |
| 2003/0108789 | A1 | * | 6/2003 | Yamakawa ............. H01M 2/20 429/121 |
| 2012/0013178 | A1 | * | 1/2012 | Lim ...................... H02J 7/0031 307/9.1 |
| 2012/0224309 | A1 | * | 9/2012 | Ikeda .................. H01M 2/1077 361/679.01 |
| 2013/0301233 | A1 | * | 11/2013 | Durfee ................ H01M 2/1077 361/807 |
| 2014/0041928 | A1 | * | 2/2014 | Yamamoto ............... H02G 3/22 174/520 |
| 2014/0077908 | A1 | * | 3/2014 | Isonaga ................... B60R 16/03 335/202 |
| 2015/0236326 | A1 | * | 8/2015 | Kim ...................... H01M 2/206 429/159 |

FOREIGN PATENT DOCUMENTS

| | | |
|---|---|---|
| JP | 2003070130 | 3/2003 |
| JP | U3152408 | 7/2009 |
| JP | 2012023945 | 2/2012 |
| KR | 10-1185735 | 9/2012 |
| WO | 99/58373 | 11/1999 |

OTHER PUBLICATIONS

European Patent Office Application Serial No. 15187952.5, Search Report dated Apr. 25, 2016, 8 pages.
Japan Patent Office Application No. 2015-207765, Office Action dated May 23, 2017, 2 pages.

* cited by examiner

[Fig. 1]
Prior Art
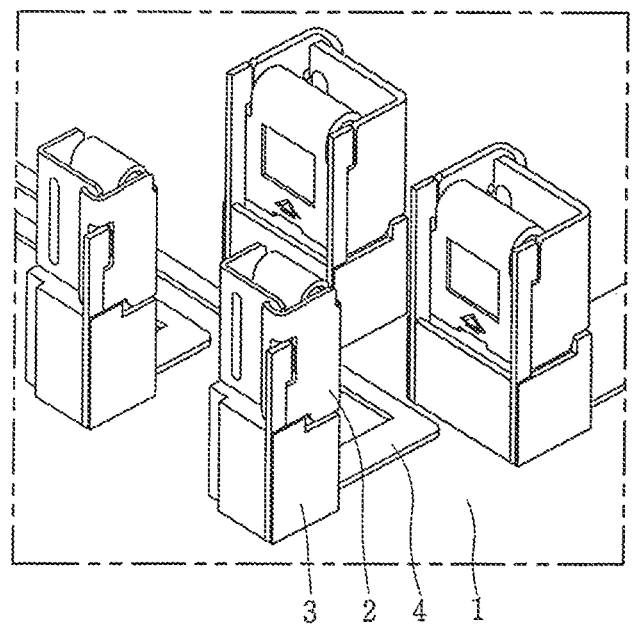

[Fig. 2]
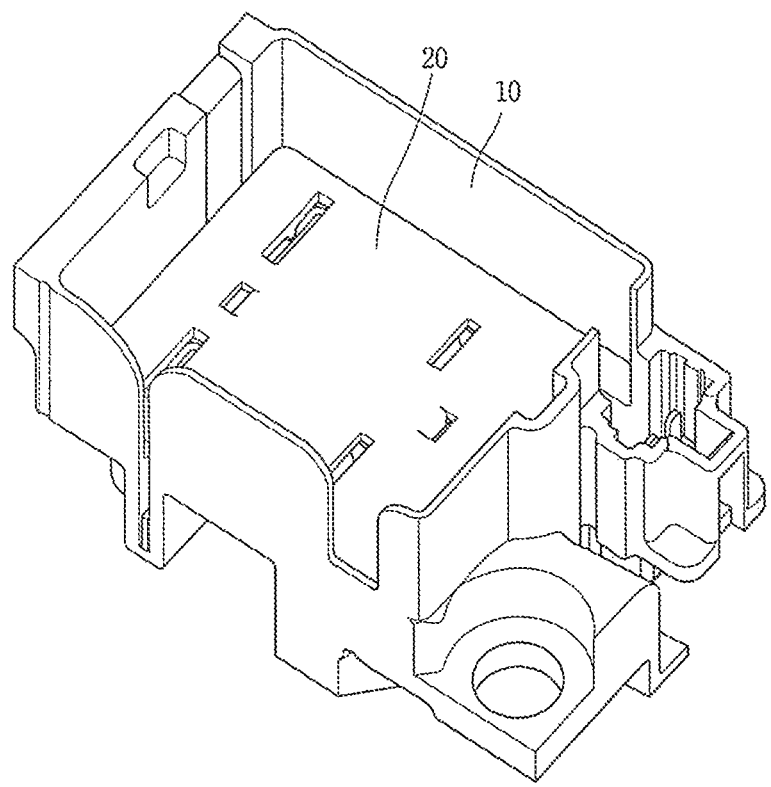

[Fig. 3]
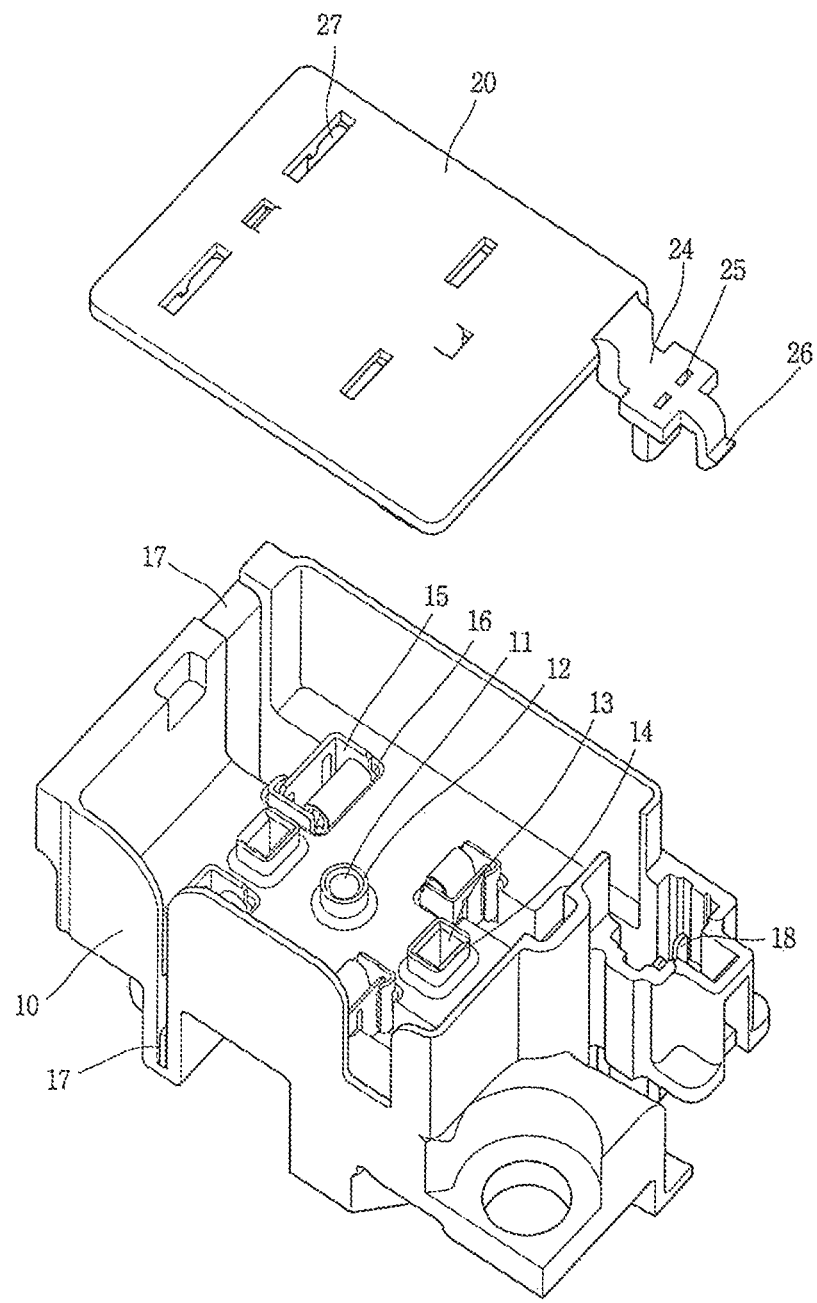

[Fig. 4]
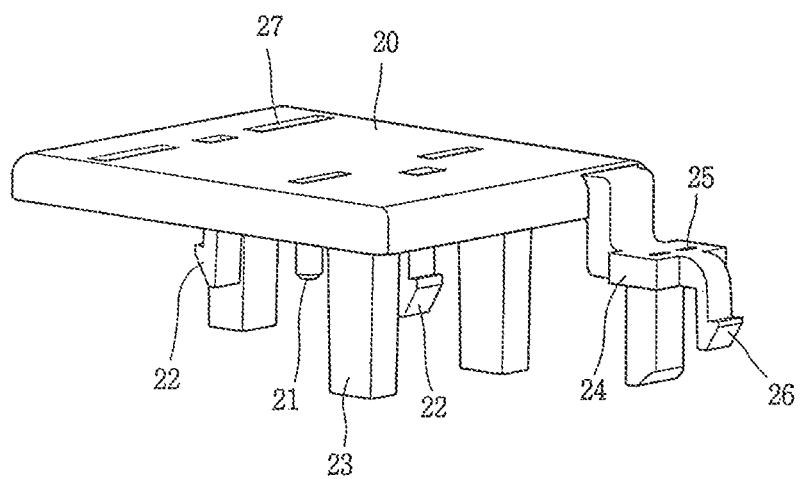

[Fig. 5]
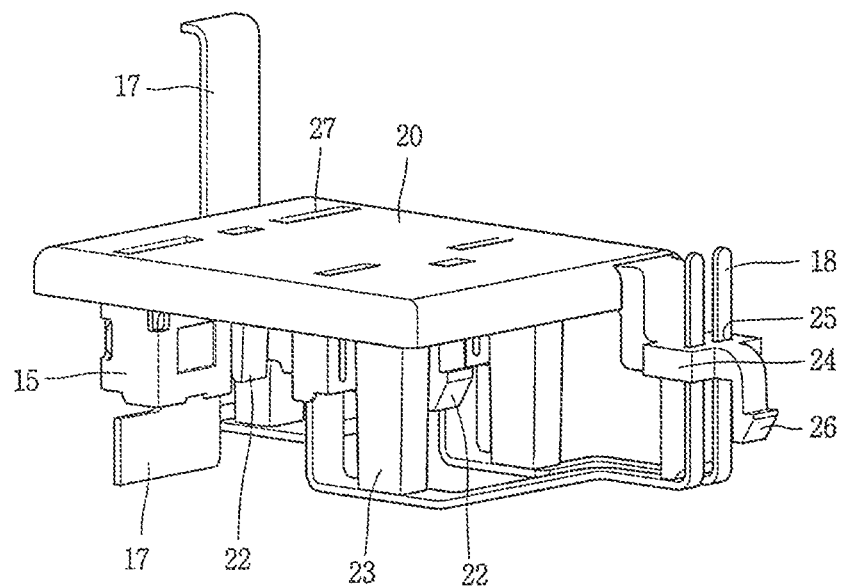

[Fig. 6]
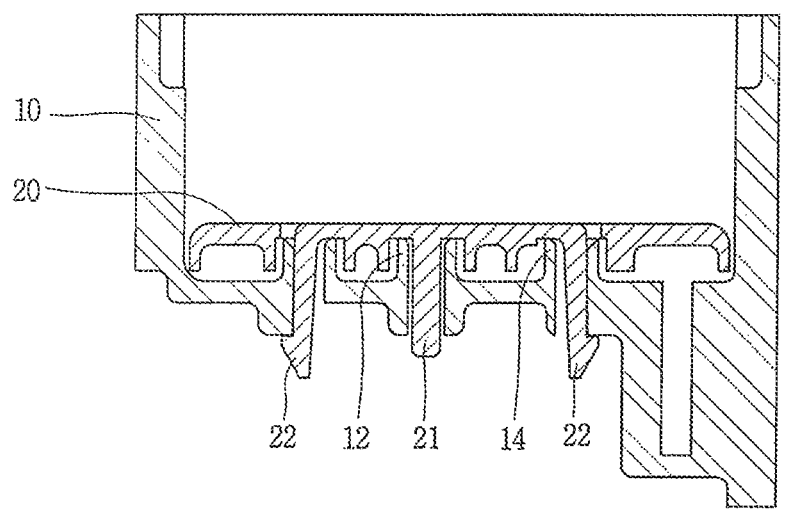

BATTERY DISCONNECT UNIT

CROSS-REFERENCE TO RELATED APPLICATION

Pursuant to 35 U.S.C. § 119(a), this application claims the benefit of earlier filing date and right of priority to Korean Patent Application No(s). 10-2015-0033876, filed on Mar. 11, 2015 the contents of which are all hereby incorporated by reference herein in its entirety.

BACKGROUND OF THE DISCLOSURE

1. Field of the Disclosure

The present disclosure relates to a battery disconnect unit (BDU), and particularly, to a BDU that is good in assemblability and couplability because a middle cover accommodated in a lower case stably supports a relay terminal and a guide bar and a hood structure are applied to the middle cover.

2. Background of the Disclosure

Generally, a BDU is equipped in electric vehicles and hybrid vehicles that produce energy by using a battery. The BDU is a module that is disposed between the battery and an inverter and includes a relay, a resister, and/or the like. The BDU stably supplies or breaks battery power to a power system of a vehicle, and when a fault current occurs, the BDU protects the power system of the vehicle.

The related art relevant to BDUs may refer to a battery disconnect unit for electric vehicle disclosed in Korean Patent Registration No. 10-1185735 (family Nos. CN102340158A, EP02418750A3, JP05174208B2, and US08760002B2).

FIG. 1 illustrates an internal perspective view of a related art BDU.

A mounting part 3 is provided in a lower case 1, and a relay terminal 2 is fitted into the mounting part 3. A bus bar 4 is connected to one end of the relay terminal 2, and an electric component such as a relay (not shown) and/or the like is connected to the other end of the relay terminal 2.

However, in the related art BDU, an element for fixing the relay terminal 2 is not provided. For this reason, as the relay terminal 2 is shaken, a connection between the relay terminal 2 and the electric component becomes unstable. Also, when the electric component connected to the relay terminal 2 is detached from the relay terminal 2, it is unable to fix the relay terminal 2, and for this reason, maintenance is difficult. In addition, it is difficult to fix the bus bar 4 connected to the relay terminal 2.

SUMMARY OF THE DISCLOSURE

Therefore, an aspect of the detailed description is to provide a BDU in which a relay terminal is stably fixed, the relay terminal is not damaged in maintenance and repair, and assemblability and couplability are good.

To achieve these and other advantages and in accordance with the purpose of this specification, as embodied and broadly described herein, a battery disconnect unit (BDU), which is disposed between a battery and an inverter to stably supply or break power of the battery to a power system of a vehicle, includes: a lower case provided in a box shape with a top opened, a relay terminal hole into which a relay terminal is fitted being disposed on a bottom of the lower case; and a middle cover accommodated into and coupled to the lower case to press the relay terminal, an electric component being mounted on a top of the middle cover, wherein a first fixing hook capable of being fastened to the lower case is provided in the middle cover.

Here, the BDU may further include a guide bar vertically provided under the middle cover, the guide bar being a reference point in assembly.

Moreover, the BDU may further include a bar hole provided in the lower case, the guide bar being coupled to the bar hole.

Moreover, the BDU may further include a bus bar fixing bar provided in the middle cover to restrict vertical movement of the bus bar.

Moreover, the BDU may further include a side leg part provided to protrude in the middle cover, a fixing hole for fixing a signal bus bar being provided in the side leg part.

Moreover, the BDU may further include a second fixing hook provided at one end of the side leg part.

In the BDU according to an exemplary embodiment of the present invention, since the relay terminal hole into which the relay terminal is inserted is provided in the lower case, the relay terminal maintains a stable position without being laterally shaken.

Moreover, since the middle cover coupled to the inside of the lower case downward presses the relay terminal, the relay terminal is not shaken upward and downward or detached.

Moreover, since the guide bar which becomes a reference point in assembly is vertically provided under the middle cover, assembly is easy.

Moreover, since the fixing hook is provided in the middle cover and the middle cover is coupled to the lower case in a fitting-coupling method, assembly is easy, and a coupling force is good.

Moreover, since the bus bar fixing bar which presses the bus bar to restrict vertical movement is provided in the middle cover, the bus bar is stably supported.

Moreover, the side leg part where the fixing hole for fixing the signal bus bar is provided is provided to protrude on one side of the middle cover, and the second fixing hook is provided at one end of the side leg part, whereby the signal bus bar is stably supported.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 illustrates an internal perspective view of a related art BDU;

FIG. 2 is a perspective view of a BDU according to an exemplary embodiment of the present invention, and an electric component such as a relay and/or the like mounted on a middle cover is not illustrated;

FIG. 3 is an exploded perspective view when a middle cover is detached from the BDU of FIG. 2;

FIG. 4 is a perspective view of the middle cover illustrated in FIG. 2;

FIG. 5 is a perspective view when a lower case is not provided in the BDU of FIG. 2; and FIG. 6 is a perspective view taken along a center line of FIG. 2 in a lengthwise direction.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, preferred embodiments of the present invention will be described in detail with reference to the accompanying drawings. However, the embodiments are provided only to disclose the invention in a manner sufficiently clear and complete for the invention to be easily carried out by a person having ordinary skill in the art to which the invention pertains, but do not mean to limit technical ideas and categories of the present invention.

FIG. 2 is a perspective view of a BDU according to an exemplary embodiment of the present invention. FIG. 3 is an exploded perspective view when a middle cover is detached from the BDU of FIG. 2. FIG. 4 is a perspective view of the middle cover illustrated in FIG. 2. FIG. 5 is a perspective view when a lower case is not provided in the BDU of FIG. 2. FIG. 6 is a perspective view taken along a center line of FIG. 2 in a lengthwise direction. A BDU according to exemplary embodiments of the present invention will be described in detail with reference to the accompanying drawings.

The BDU according to an exemplary embodiment of the present invention may be disposed between a battery and an inverter and may stably supply or break power of the battery to a power system of a vehicle. The BDU may include: a lower case 10 that is provided in a box shape with a top opened, a relay terminal hole 16 into which a relay terminal 15 is fitted being disposed on a bottom of the lower case 10; and a middle cover 20 that is accommodated into and coupled to the lower case 10 to press the relay terminal, an electric component being mounted on a top of the middle cover 20. A first fixing hook 22 capable of being fastened to the lower case 10 may be provided in the middle cover 20.

The lower case 10 may be provided in a box shape with the top opened. A plurality of the relay terminal holes 16 may be provided in the bottom of the lower case 10. The relay terminal 15 may be fitted into the relay terminal hole 16. The relay terminal 15 may be a terminal that connects a bus bar 17 to an electric component (not shown) such as a relay, a resistor, a sensor, and/or the like. As the relay terminal 15 is fitted into the relay terminal hole 16 and fixed to the lower case 10, the relay terminal 15 maintains a stable position without being laterally shaken.

The bus bar 17 which is connected to the relay terminal 15 at one end of the bus bar 17 may be disposed under the lower case 10 to avoid interference therebetween. The bus bar 17 may act as a connection path between a plurality of electric components or between a power source and a load.

A bar hole 11 which a guide bar 21 of the middle cover 20 is inserted into and coupled to may be provided in the lower case 10. The bar hole 11 may be approximately disposed at a center portion of the middle cover 20. The guide bar 21 may be inserted into the bar hole 11, and thus, when the middle cover 20 is coupled to the lower case 10, the bar hole 11 may be used as an assembly reference point, thereby enhancing assemblability.

A circular pipe supporter 12 may be provided near the bar hole 11. The circular pipe supporter 12 may be provided for stably supporting the guide bar 21. The circular pipe supporter 12 may be provided to have a certain height from a floor of the lower case 10.

A hook hole 13 which the first fixing hook 22 of the middle cover 20 is inserted into and coupled to may be provided in plurality in the lower case 10. The first fixing hook 22 of the middle cover 20 may be fitted into the hook hole 13.

A square pipe supporter 14 may be provided near the hook hole 13. The square pipe supporter 14 may be provided for stably supporting the first fixing hook 22.

The middle cover 20 may be provided in a form capable of covering the inside of the lower case 10. Also, the middle cover 20 may be provided to have a size capable of being accommodated in the lower case 10. The middle cover 20 may be inserted into and coupled to the lower case 10 to press an upper end of the relay terminal 15. Since the middle cover 20 downward presses the relay terminal 15, the relay terminal 15 maintains a stable position without being upward and downward shaken. Therefore, even when an electric component such as a relay and/or the like is detached from the BDU, the relay terminal 15 stably maintains a coupling state without being shaken or detached, and thus, management and maintenance of components are easy.

The guide bar 21 may be provided to protrude under the middle cover 20. The guide bar 21 may protrude in a cylindrical shape at a lower center portion of the middle cover 20. When the middle cover 20 is coupled to the lower case 10, the guide bar 21 may be coupled to the bar hole 11 and thus may be used as a reference of an assembly position. Accordingly, assembly is easy.

The first fixing hook 22 may be provided in plurality in the middle cover 20. The first fixing hook 22 may be provided as a fastening means that couples the middle cover 20 to the lower case 10. Since the first fixing hook 22 is provided, the middle cover 20 may be simply coupled to the lower case 10 in a fitting method, and thus, assembly is easy, thereby enhancing productivity.

The plurality of first fixing hooks 22 may be symmetrically provided near the guide bar 21. Therefore, coupling stability is enhanced. That is, a pair of first fixing hooks 22 may be symmetrically provided near the guide bar 21, and thus, when the middle cover 20 is coupled to the lower case 10, a force may be applied in a direction where a hook opens outward to both sides. Accordingly, the middle cover 20 can endure a bidirectional external force, and thus, components cannot be easily detached from the BDU.

A bus bar fixing bar 23, which presses the bus bar 17 mounted on the lower case 10 to restrict shaking or up, down, left, and right movements, may be provided in plurality in the middle cover 20. The bus bar 17 installed in the lower case 10 may be stably fixed by the bus bar fixing bar 23, and thus, a problem such as a contact failure and/or the like cannot occur when a current flows.

A side leg part 24 may be provided to protrude in the middle cover 20. A fixing hole 25 for fixing a signal bus bar 18 may be provided in the side leg part 24. The fixing hole 25 may be provided in the side leg part 24 for fixing the signal bus bar 18 which deviates from the lower case 10 to one side. The signal bus bar 18 may be fitted into the fixing hole 25 and thus may be supported by the side leg part 24.

A second fixing hook 26 may be provided in the side leg part 24. The second fixing hook 26 may be fixed and coupled to a portion of the lower case 10 and may stably support the signal bus bar 18.

An electric component hole 27, into which an electric component such as a relay and/or the like is inserted to be connected to the relay terminal 15, may be provided in plurality in the top of the middle cover 20. An electric component, such as a relay, a resistor, a sensor, and/or the like, may be located on the middle cover 20 and may be connected to the relay terminal 15 through the electric component hole 27. In order to easily understand coupling between a case and a cover, an electric component is not illustrated in each of the drawings.

In the BDU according to an exemplary embodiment of the present invention, since the relay terminal hole into which the relay terminal is inserted is provided in the lower case, the relay terminal maintains a stable position without being laterally shaken.

Moreover, since the middle cover coupled to the inside of the lower case downward presses the relay terminal, the relay terminal is not shaken upward and downward or detached.

Moreover, since the guide bar which becomes a reference point in assembly is vertically provided under the middle cover, assembly is easy.

Moreover, since the fixing hook is provided in the middle cover and the middle cover is coupled to the lower case in a fitting-coupling method, assembly is easy, and a coupling force is good.

Moreover, since the bus bar fixing bar which presses the bus bar to restrict vertical movement is provided in the middle cover, the bus bar is stably supported.

Moreover, the side leg part where the fixing hole for fixing the signal bus bar is provided is provided to protrude on one side of the middle cover, and the second fixing hook is provided at one end of the side leg part, whereby the signal bus bar is stably supported.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A battery disconnect unit (BDU) located between a battery and an inverter to stably supply or break power from the battery to a power system of a vehicle, the BDU comprising:
   a lower case having a box shape with an open top and a first hole located on a bottom of the lower case into which a relay terminal is fitted;
   a middle cover located in and coupled to the lower case to press the relay terminal; and
   a guide bar under the middle cover, the guide bar a reference point for assembly,
   wherein the middle cover comprises a first hook capable of being fastened to the lower case,
   wherein the lower case comprises a second hole to which the guide bar is coupled, and
   wherein a circular supporter for stably supporting the guide bar is located near the bar hole.

2. The BDU of claim 1, wherein the middle cover further comprises a bar to restrict vertical movement of a bus bar.

3. The BDU of claim 1, wherein the middle cover further comprises a protruding leg portion, the leg portion including a hole for attaching a signal bus bar.

4. The BDU of claim 3, wherein the leg portion further includes a second hook at one end.

* * * * *